United States Patent
Xie

(10) Patent No.: US 8,602,504 B2
(45) Date of Patent: Dec. 10, 2013

(54) POLYURETHANE ELASTOMER OF HIGH QUALITY

(75) Inventor: Rui Xie, Pearland, TX (US)

(73) Assignee: Dow Global Technologies LLC., Midland, MI (US)

( * ) Notice: Subject to any disclaimer, the term of this patent is extended or adjusted under 35 U.S.C. 154(b) by 237 days.

(21) Appl. No.: 11/663,011

(22) PCT Filed: Oct. 13, 2005

(86) PCT No.: PCT/US2005/036911
§ 371 (c)(1),
(2), (4) Date: Mar. 15, 2007

(87) PCT Pub. No.: WO2006/047103
PCT Pub. Date: May 4, 2006

(65) Prior Publication Data
US 2008/0097067 A1   Apr. 24, 2008

Related U.S. Application Data

(60) Provisional application No. 60/621,010, filed on Oct. 21, 2004.

(51) Int. Cl.
*B60B 5/02* (2006.01)
*C08G 18/00* (2006.01)

(52) U.S. Cl.
USPC .............. 301/64.701; 301/5.301; 280/11.221; 280/841; 528/65; 528/80; 528/81; 528/84; 528/85

(58) Field of Classification Search
USPC ........................ 528/44, 67, 81, 65, 80, 84, 85; 280/11.221, 841; 301/5.301, 64.701
See application file for complete search history.

(56) References Cited

U.S. PATENT DOCUMENTS

| | | | |
|---|---|---|---|
| 2,993,478 A | 4/1960 | Young et al. | |
| 3,084,177 A | 4/1963 | Hostettler et al. | |
| 3,240,730 A | 3/1966 | Hostettler et al. | |
| 3,392,128 A | 7/1968 | Hostettler et al. | |
| 3,392,153 A | 7/1968 | Hostettler et al. | |
| 3,509,102 A | 4/1970 | Horn et al. | |
| 3,645,986 A | 2/1972 | Rifi | |
| 3,689,443 A * | 9/1972 | Fensch | 525/411 |
| 3,700,643 A | 10/1972 | Smith et al. | |
| 3,775,354 A | 11/1973 | Hostettler et al. | |
| 3,896,303 A | 7/1975 | Gerkin et al. | |
| 3,915,923 A | 10/1975 | Ward | |
| 3,923,747 A | 12/1975 | Kolycheck | |
| 3,989,676 A | 11/1976 | Gerkin et al. | |
| 4,045,474 A | 8/1977 | Taller et al. | |
| 4,080,318 A | 3/1978 | Smith et al. | |
| 4,086,214 A * | 4/1978 | Cardy | 528/52 |
| 4,086,293 A | 4/1978 | Smith et al. | |
| 4,124,552 A | 11/1978 | Koleske et al. | |
| 4,153,777 A | 5/1979 | Slagel | |
| 4,264,757 A | 4/1981 | Park | |
| 4,276,405 A | 6/1981 | Koleske et al. | |
| 4,463,156 A * | 7/1984 | McGary et al. | 528/65 |
| 4,551,518 A | 11/1985 | Matsumoto et al. | |
| 4,647,596 A | 3/1987 | Ishii et al. | |
| 5,334,673 A * | 8/1994 | Wu | 473/378 |
| 5,959,059 A | 9/1999 | Vedula et al. | |
| 5,962,619 A | 10/1999 | Seneker et al. | |
| 5,990,258 A | 11/1999 | Peter | |
| 6,075,113 A | 6/2000 | Masterman et al. | |
| 6,174,984 B1 | 1/2001 | Peter | |
| 6,221,999 B1 | 4/2001 | Peter | |
| 6,632,913 B2 | 10/2003 | Matsumoto et al. | |
| 2006/0004174 A1* | 1/2006 | Omori et al. | 528/44 |

FOREIGN PATENT DOCUMENTS

GB   1256900       12/1971
JP   2001-253927   * 9/2001 ............ G03G 15/16

OTHER PUBLICATIONS

Adhikari, Raju et al., "Effect of polydimethylsiloxane macrodiol molecular weight on properties and morphology of polyurethane and polyurethaneurea", Journal of Applied Science (2003), 90(6), pp. 1565-1573.

* cited by examiner

*Primary Examiner* — Michael L Leonard

(57) ABSTRACT

The present invention relates to cast polyurethane elastomers of high resilience, clarity, and attractive abrasion resistance derived from polyurethane systems comprising a customized selection of polycaprolactone polyol incorporated into the isocyanate and/or isocyanate-reactive composition.

4 Claims, No Drawings

POLYURETHANE ELASTOMER OF HIGH QUALITY

The present invention relates to a polyurethane elastomer and more particularly a cast polyurethane elastomer exhibiting attractive resilience and high clarity.

So called cast polyurethane elastomers, are widely used in rollers, belts, solid tires, and the like, because of their excellent physical traits including mechanical characteristics, wear resistance and resistance to oils. In general, polyurethane elastomers can be formed by reacting an isocyanate, for example, methylene diphenylisocyanate (MDI), toluene diisocyanate, naphthalene diisocyanate, etc., with an organic polyol, for example, polytetramethylene ether glycol, polyester diol, polyoxypropylene glycol, etc., and a chain extender, for example, an aliphatic diol such as 1,4-butanediol. Additional components such as catalysts, surfactants and the like can also be added to the elastomer-forming reaction mixture in the usual amounts. The overall properties including resilience and clarity of the polyurethane will depend upon the type of polyol and isocyanate including its molecular weight of the polyurethane and chemical structure of the polyurethane backbone, the degree of crosslinking, cystallinity, and phase separation in the polyurethane. It is generally understood that to enhance optical clarity the polymer should typically have a low crystalline content and/or a low or no macro phase separation; crystallinity or phase separation enhances opportunity for reflectance of light which confers lack of clarity to the polymer.

Several methods are described in the art for preparing elatomers having good resilience and clarity. U.S. Pat. No. 6,221,999 discloses a polyurethane elastomer possessing a resilience of at least about 50 percent and a clarity index of at least about 80 percent. The elastomer is obtained by reacting: an isocyanate-terminated prepolymer derived from methylene diphenylisocyanate (MDI)-based and a polyether polyol; with at least one polyether diol; and in the presence of at least one diol chain extender having from 5 to 16 carbon atoms. The selected diols are proposed as necessary to bring about the clarity. Similarly, U.S. Pat. No. 5,990,258 discloses like chemistry for preparing a roller skate wheel.

U.S. Pat. No. 6,174,984 discloses a polyurethane elastomer of high resilience and clarity which is the reaction product of a prepolymer of at least one diisocyanate having a free diisocyanate level of less than one percent.

U.S. Pat. No. 5,962,619 discloses a process making clear elastomers using an alternative chemistry. First, a polyol having a narrow molecular weight distribution (Mw/Mn<1.5) is reacted with an aromatic diisocyanate at an NCO/OH ratio from 1.3 to 3.0 to give a non-viscous isocyanate-terminated prepolymer. Subsequently, a mixture that contains this prepolymer and an aliphatic diisocyanate is then reacted with an aromatic diamine to give a clear polyurea elastomer.

U.S. Pat. No. 4,153,777 discloses polyurethane elastomers of good clarity derived from the reaction of a cycloaliphatic isocyanate with a polyether or polyester polyol and a curative polyol of low molecular weight.

Despite a varied knowledge concerning the preparation of polyurethane elastomers exhibiting the clarity and resilience properties described above, there is still an outstanding need to be able to prepare such elastomer from readily available raw materials and where in addition to clarity and resilience, other properties such as abrasion resistance and flexural fatigue are also enhanced. While traditionally polyurethane elastomers excelling in resilience and clarity have been largely based on polyether polyols they often are deficient in abrasion resistance and flexural fatigue. To minimize such deficiencies, the use of alternative materials, including polylactone polyols (polyester polyols), and notably polycaprolactone polyols, has been investigated. The use of such polyols in the preparation of polyurethane elastomer is disclosed in various publications including U.S. Pat. Nos. 2,933,478; 3,775,354; 3,923,747; 4,086,214; 4,551,518; and 4,647,596; and in G.B Patent 1,256,900. G.B. Patent No 1,256,900 discloses thermoplastic polyurethane of high transparency obtained by a one stage, non prepolymer process, involving the reaction of methylene diphenylisocyanate (MDI) with a polyol composition containing a mixture of high molecular weight and low molecular weight polycaprolactone polyol and a chain extending agent, followed by granulation and extrusion. Such thermoplastic material is generally not suitable for applications where high resilience is required and where susceptibility to deformation due to thermal build up is a possibility.

It has now been discovered that use of polylactone polyols and more particularly polycaprolactone polyols in a specific manner can provide for the formation of a thermoset polyurethane elastomer exhibiting attractive properties including clarity and resilience.

In a first aspect, this invention relates to a polyurethane elastomer possessing a resilience of at least about 50 percent and a clarity index of at least about 80 percent obtained by contacting under elastomer-forming conditions a urethane-modified isocyanate which is the reaction product of an aromatic polyisocyanate with a polycaprolactone polyol; with an isocyanate-reactive composition that comprises:
  a) a polycaprolactone or a caprolactone-ether copolymer polyol having an average molecular weight of greater than 1000 Dalton;
  b) a polycaprolactone polyol or a polyether polyol having an average molecular weight of less than 1000 Dalton; and
  c) an aliphatic chain extending agent which is a diol having from 2 to 16 carbon atoms.

In another aspect, this invention relates to an article which comprises a molded or shaped polyurethane elastomer as described above.

In yet another aspect, this invention relates to a two component system suitable for preparation of polyurethane elastomers when subjected to elastomer-forming conditions, said system comprising:
  a) as one component, a urethane-modified isocyanate having an isocyanate content of from 5 to 15 weight percent obtained by reaction of an aromatic polyisocyanate with a polycaprolactone polyol and/or a caprolactone-ether copolymer polyol; and
  b) as another component, an isocyanate-reactive composition that comprises:
    i) a polycaprolactone polyol and/or a caprolactone-ether copolymer polyol having an average molecular weight of greater than 1000 Dalton;
    ii) a polycaprolactone and/or polyether polyol having an average molecular weight of less than 1000 Dalton; and
    iii) an aliphatic chain extending agent which is a diol having from 2 to 16 carbon atoms.

In yet another aspect, this invention relates to a process for preparing a cast polyurethane elastomer possessing a resilience of at least about 50 percent and a clarity index of at least about 80 percent obtained by contacting under elastomer-forming conditions a urethane-modified isocyanate which is the product of an aromatic polyisocyanate with a polycaprolactone polyol; with an isocyanate-reactive composition that comprises:

a) a polycaprolactone polyol and/or caprolactone-ether copolymer polyol having an average molecular weight of greater than 1000 Dalton;
b) a polycaprolactone polyol and/or polyether polyol having an average molecular weight of less than 1000 Dalton; and
c) an aliphatic chain extending agent which is a diol having from 2 to 16 carbon atoms, wherein the urethane-modified isocyanate and isocyanate-reactive composition are brought together in proportions to provide for an isocyanate reaction index of from 80 to 120.

In yet a further aspect, this invention pertains to thermoset polyurethane elastomer obtained by reacting a urethane-modified isocyanate with an isocyanate-reactive composition characterized in that the resulting elastomer exhibits the following properties:
a) a rebound-resilience of at least 50 percent, according to test procedure ASTM-D-2632;
b) an abrasion resistance (loss) of less than 15 mg/1000 cycles, according to test procedure ASTM D-3389; and
c) a clarity index of at least 80 percent.

The disclosed invention relating to polyurethane elastomers places emphasis on the use of polylactone polyols and caprolactone-ether copolymer polyols as components on both the A-side (isocyanate) and on B-side (isocyanate reactive composition) of the system from which the elastomer is formed. In general polylactones polyols are prepared by the reaction of a lactone monomer; illustrative of which is δ-valerolactone, ε-caprolactone, ε-methyl-ε-caprolactone, ξ-enantholactone, and the like; with an initiator that has active hydrogen-containing groups; illustrative of which is ethylene glycol, diethylene glycol, propanediols, 1,4-butanediol, 1,6-hexanediol, trimethylolpropane, mixtures of two or more thereof, and the like including their oligomers. The production of such polyols is known in the art; see, for example, U.S. Pat. Nos. 3,169,945; 3,021,309; and 3,021,317. Suitable caprolactone ether copolymer polyols may be made from polyethers with a molecular weight of 200 to 2000 and a functionality of 2 to 3, with lactone monomers. The production of such polyols is known in the art, for example U.S. Pat. No. 6,632,913 disclosed herein by reference. In general, such copolymer polyols are obtained by including a polyether, preferably a diol, in the reaction mixture during the ring-opening polymerization of the lactone monomer.

For the present invention relating to thermoset polyurethane elastomers, the preferred lactone polyols are the di-, tri-, and tetra-hydroxyl functional ε-caprolactone polyols known as polycaprolactone polyols, while the preferred lactone ether copolymer polyols are di-, tri-, and tetra-hydroxyl functional ε-caprolactone tetramethylene ether copolymer polyols. Especially preferred are the materials approximating to dihydroxy functional materials for the purpose of obtaining elastomers with attractive resilience or rebound characteristics.

The thermoset polyurethane elastomer of this invention advantageously has a hardness in the range of from 60 to 100, and preferably from 75 to 95 Shore A units and is characterized by a high resilience, a high clarity index, and attractive abrasion resistance. By resilience, it is understood an elastomer having a resilience of at least 50, preferably at least 60 and more preferably at least 70 percent; as measured by ASTM D 2632. By clarity it is understood an elastomer having an optical clarity index of at least 80, preferably at least 85, and more preferably at least 90 percent; as measured by a suitable optical transparency procedure. The test procedure ASTM D-1003 permits the optical clarity of polymers to be assessed by measurement of extent of light transmission. By abrasion resistance, it is understood an elastomer exhibiting an abrasion resistance (loss) of less than about 15, preferably less than about 12, and more preferably less than about 9 mg/1000 cycles as measured according to test procedure ASTM D-3389.

The polyurethane elastomer is obtained by contacting, under elastomer-forming conditions, a urethane-modified aromatic isocyanate with a particular isocyanate-reactive composition. Such procedure involving the prior formation of a urethane-modified isocyanate is generally referred to as a two-step procedure in contrast to a one-step procedure using non-modified isocyanate. Depending on availability of equipment; the urethane-modified aromatic isocyanate and isocyanate-reactive components can be introduced simultaneously as individual streams to a mixing chamber prior to pouring and manufacturing an elastomer. Alternatively, and often of greater convenience, the isocyanate reactive materials can be pre-blended to provide an isocyanate-reactive composition which is then subsequently mixed with the urethane-modified isocyanate under elastomer-forming conditions.

The urethane-modified aromatic isocyanate employed for the manufacture of the polyurethane elastomer typically has an average isocyanate content of from 5 to 20, preferably from 5 to 15, and more preferably from 7 to 14 weight percent. Such urethane-modified aromatic isocyanate is obtained by reacting an excess of an aromatic polyisocyanate with a polycaprolactone polyol, or a caprolactone ether copolymer polyol or a mixtures thereof optionally with a minor amount of polyether polyol, such as for example a polyether diol including a polytetramethylene polyether glycol. Exemplary of suitable aromatic isocyanates include 2,4- or 2,6-toluene diisocyanate; 2,2'-, 2,4'- or 3,4'- or 4,4'-methylene diphenylisocyanate; or 1,5-naphthalene diisocyanate. Preferred as aromatic polyisocyanate is methylene diphenylisocyanate (MDI). In general, MDI is an isomeric mixture composed of the 4,4'-MDI isomer and other isomers such as, for example, the 2,4'-MDI isomer and/or the 2,2'-MDI isomer. When employing MDI herein, it is particularly advantageous that MDI be made up of at least a major proportion by weight of the 4,4'-MDI isomer in order to obtain a polyurethane elastomer having a high resiliency. Accordingly, the MDI usable according to the instant invention shall contain the 4,4'-MDI isomer at least about 80, preferably at least about 85, more preferably at least about 95 percent by weight the balance being other isomers such as the 2,4'-MDI isomer and/or 2,2'-MDI isomer. It is particularly advantageous to employ MDI wherein substantially all of the MDI is the 4,4-MDI isomer, that is, in an amount of from 97 to 100 percent by weight of the MDI.

The polycaprolactone polyol or the caprolactone ether copolymer polyol as used to prepare the urethane-modified isocyanate typically has an average molecular weight in the range of 1000 to 10,000, preferably from 1500 to 7,000 and more preferably from 2,000 to 5,000 Dalton. Typically such polyol will have an average functionality in the range of from 2 to 4; preferred are those with a functionality of 2 to 2.5. By functionality, it is understood the number of isocyanate-reactive moieties per molecule, in this instance hydroxyl groups per molecule. Suitable polycaprolactone and caprolactone ether copolymer polyols are commercially available and include products designated as TONE™ 2241 polymer or TONE 7241 polymer available from The Dow Chemical Company, or alternatively material designated as CAPA™ 2200P caprolactone or CAPA 720 caprolactone available from Solvay. The urethane-modified isocyanate is prepared by standard procedures well known to a person skilled in the art and such as disclosed, for example, in U.S. Pat. No. 4,294,951; 4,555,562; or 4,182,825.

The urethane-modified isocyanate is reacted with a particular isocyanate reactive composition to provide the polyurethane elastomer. The isocyanate reactive composition is characterized in that it comprises three components. The first isocyanate-reactive component is a polycaprolactone polyol or polycaprolactone-polyether copolymer polyol having a molecular weight of greater than 1000 Dalton, preferably in the range of from 1000 to 10000, more preferably from 1500 to 8000, and yet more preferably from 2000 to 6000 Dalton. While such polyol may have an average functionality in the range of from 2 to 4, preferred are those with a functionality of from 2 to 2.5. The second isocyanate-reactive component is a polycaprolactone polyol or polyether polyol, which differs from the first isocyanate reactive component, having a molecular weight of from 300 to 1000, preferably in the range of from 300 to 900, and more preferably from 300 to 600 Dalton. While such polyol may have an average functionality in the range of from 2 to 4, preferred are those with a functionality of from 2 to 2.5. The third component is an aliphatic chain extending agent of molecular weight of less than 300 Dalton and which is a diol having from 2 to 16, preferably from 2 to 6, more preferably from 2 to 4 carbon atoms in the molecule. Illustrative of such diols are ethylene glycol, propylene glycol, 1,4-butanediol, 1,5-pentanediol and 1,6-hexanediol; preferred is 1,4-butanediol. For the purpose of preparing a cast polyurethane elastomer the use of an aliphatic diol chain extending agent is preferred over an amine extending agent, such as ethylene diamine, due to reactivity considerations. Such amine agents have greater utility when intending to prepare a spray polyurethane elastomer.

To provide for the desired performance characteristics including resilience, optical clarity and abrasion resistance the isocyanate-reactive components as described above are present in defined amounts (in terms of mole ratios). The first component is present in the amount of from 5 to 50, preferably from 10 to 40, and more preferably from 25 to 35 moles. The second component is present in the amount of from 5 to 40, preferably from 10 to 30, and more preferably from 15 to 25 moles. The third component is present the amount of from 30 to 90, preferably 40 to 80, and more preferably from 50 to 70 moles. The inventors have chosen to express the relative amounts in moles of material as this permits a correct characterization of the blend or composition when variance in molecular weight and functionality of the materials occurs and its subsequent reaction stoichiometry with the isocyanate. The use of the first, second and third component terms herein for the purpose of distinguishing three of the necessary components in the isocyanate reactive composition and is not used to indicate a particular order of addition of reactants, etc.

In addition to the aforementioned components the isocyanate reactive composition may also contain catalysts, surfactants and other additives commonly utilized when preparing polyurethane elastomers. Useful catalysts include any of those known in the art for this purpose and mixtures thereof. Such catalysts include tertiary amine compounds or organometallic compounds based on metals such as tin or titanium. A preferred catalyst for use herein is FORMREZ™ UL-32 understood to be a dioctyl tin dimercaptide and is available from Crompton Corporation. The amount of catalyst employed in the reaction mixture, where present, will ordinarily range from 0.001 to 1 weight percent and preferably from 0.005 to 0.2 weight percent, by weight of the isocyanate-reactive mixture.

Various other additives can also be present when preparing the polyurethane elastomer of this invention, for example, plasticizers such as dioctyl phthalate and tributoxyethyl phosphate, which can be added to lower cost and/or modify the physical properties of the elastomer. Dyes can be added for color providing they are not detrimental to the desired clarity index of the resulting elastomer. In addition, pigments, antioxidants, UV stabilizers, and the like, can also be added in the customary amounts. Unless elastomer of a reduced density is desired, substances which act in the capacity of chemical, for example water, or physical blowing agents will normally be absent or limited to being present in trace amounts such as can be inherent to the starting materials.

The urethane-modified isocyanate and above described isocyanate reactive components/compositions are brought together in proportions to provide for an isocyanate reaction index of from 80 to 120, preferably from 90 to 110, and more preferably from 95 to 105. An isocyanate reaction index of 100 corresponds to one equivalent of isocyanate reacting with one equivalent of isocyanate-reactive material. Operating at indices outside this range generally will not provide for polyurethane elastomer exhibiting the desired physical properties.

The polyurethane elastomer of this present invention is useful in a variety of applications which can take advantage of the good clarity, resilience and abrasion characteristics offered by the elastomer. The elastomer of this invention finds particular utility in the manufacture of cast polyurethane articles which are susceptible to frictional heat accumulation when in use such as, for example, polishing pads, shoes and rolling objects including rollers and wheels. The elastomer of the present invention, based on polycaprolactone components is eminently suitable for the manufacture cast polyurethane elastomers such as wheels that may be found in sporting goods including roller skate and roller blade wheels where its physically properties are to be preferred over traditional polyether polyol-based systems.

The following examples are given to illustrate the invention and should not be interpreted as limiting it in any way. Unless stated otherwise, all parts and percentages are by weight. Materials used in the examples are described as follows:
Isocyanate A VORANATE™ M125 specialty isocyanate, a commercial blend of 4,4'- and 2,4'-MDI in a ratio of 98:2 available from The Dow Chemical Company.
Polyol A TONE 2241 polymer, a polycaprolactone diol of molecular weight of 2010, available from The Dow Chemical Company.
Polyol B TONE 7241 polymer, a polycaprolactone diol of molecular weight of 2045 available from The Dow Chemical Company.
Polyol C a polytetramethylene ether glycol having a molecular weight of 2032, available as TERATHANE™ 2000 from DuPont.
Polyol D TONE 32B8 polymer, a polycaprolactone diol with a molecular weight of 400 available from The Dow Chemical Company.
Polyol E 1,4-butanediol.
Polyol F 1,8-octanediol.
Polyol G TONE 0201 polymer, a polycaprolactone diol with a molecular weight of 530 available from The Dow Chemical Company.
Isocyanate Prepolymer 1
A reactor is charged with 789 parts by weight of Isocyanate A and preheated to 50° C. To the warmed isocyanate is added, in increments to avoid exothermic conditions exceeding 85° C., a total of 1000 parts by weight of Polyol A. The resulting mixture is maintained at a temperature of about 80° C. under nitrogen with stirring for a period of about 5 hours to bring the reaction to completion. In this manner, a prepolymer is obtained that has an isocyanate content of 12.5 percent.

Isocyanate Prepolymer 2

Prepolymer 2 is synthesized in the same manner as for Prepolymer 1 with the exception that polyol A is replaced in its entirety by 1000 parts of Polyol B. The obtained prepolymer has an NCO content of 12.6 percent.

Isocyanate Prepolymer 3

Prepolymer 3 is synthesized in the same manner as for Prepolymer 1 with the exception that 375 parts of Isocyanate A is reacted with a total of 1000 parts by weight of Polyol A. The resulting prepolymer has an NCO content of 6.0 percent.

Isocyanate Prepolymer 4

Prepolymer 4 is synthesized in the same manner as for Prepolymer 1 with the exception that Polyol A is substituted in its entirety by 1000 parts of Polyol C. The obtained prepolymer has an NCO content of 12.4 percent.

Elastomer 1

An isocyanate reactive composition is prepared which comprises Polyol A (72.15 parts by weight); Polyol D (11.86 pbw); and Polyol E (7.15 pbw). This corresponds to an isocyanate reactive composition wherein the three principle components are present in a mole ratio which corresponds to 25:20:55. Additionally present is 0.02 pbw of the catalyst FORMREZ UL-32 available from Crompton Corporation.

A cast elastomer is prepared by contacting the above described isocyanate-reactive composition with 100 parts by weight of Prepolymer 1, both preheated to about 65° C., using a Flactek Speed Mixer operated at 2500 rpm for 20 seconds. The resulting mixture is then poured into a compression button mold preheated to 120° C. After about 10 minutes, the elastomer is demolded and subsequently conditioned at room temperature for 7 days prior to measurement of physical properties as reported below.

| Hardness | (ASTM D 2240) | 72-73 Shore A |
|---|---|---|
| Rebound | (ASTM D 2632) | 58 percent |
| Abrasion Resistance | (ASTM D 3389) | 8 mg/1000 cycles |
| Clarity Index | | 100 |

Clarity was determined by measuring the ability of an observer having 20-20 vision (with or without corrective lenses) to read through a ⅝ thick sample of the polyurethane provided in Examples 1-4 and Comparative Examples 1-4. Random 14 pitch Times New Roman capital letters were printed on plain white paper. The clarity index is given as the percent of letters than can accurately be identified by the observer through the polyurethane sample viewed from a distance of 18 inches.

Elastomer 2

Elastomer 2 is prepared in the same manner as described for Elastomer 1, except 100 parts by weight of Prepolymer 3 is reacted with an isocyanate reactive composition that comprises Polyol A (18 parts by weight), Polyol D (1.39 pbw) and Polyol E (5.11 pbw). This corresponds to an isocyanate reactive composition wherein the three principle components are present in a mole ratio which corresponds to 13:5:82.

The elastomer is observed to have the following physical properties:

| Hardness | (ASTM D 2240) | 75-76 Shore A |
|---|---|---|
| Rebound | (ASTM D 2632) | 70 percent |
| Abrasion Resistance | (ASTM D 3389) | 6 mg/1000 cycles |
| Clarity Index | | 100 |

Elastomer 3

Elastomer 3 is prepared in the same manner as described for Elastomer 1, except 100 parts by weight of Prepolymer 2 is reacted with an isocyanate reactive composition that comprises Polyol B (74.35 parts by weight), Polyol D (11.63 pbw) and Polyol E (7.20 pbw). This represents an isocyanate reactive composition wherein the three principle components are present in a mole ratio which corresponds to 25:20:55.

The elastomer is observed to have the following physical properties:

| Hardness | (ASTM D 2240) | 76-77 Shore A |
|---|---|---|
| Rebound | (ASTM D 2632) | 72 percent |
| Abrasion Resistance | (ASTM D 3389) | 5 mg/1000 cycles |
| Clarity Index | | 100 |

Elastomer 4

Elastomer 4 is prepared in the same manner as described for Elastomer 1 except 100 parts by weight of Prepolymer 2 is reacted with an isocyanate reactive composition that comprises Polyol B (89.22 parts by weight), Polyol D (11.63 pbw) and Polyol E (6.54 pbw). This represents an isocyanate reactive composition wherein the three principle components are present in a mole ratio which corresponds to 30:20:50.

The elastomer is observed to have the following physical properties:

| Hardness | (ASTM D 2240) | 72-73 Shore A |
|---|---|---|
| Rebound | (ASTM D 2632) | 74 percent |
| Abrasion Resistance | (ASTM D 3389) | 7 mg/1000 cycles |
| Clarity Index | | 100 |

Elastomer 5

Elastomer 5 is prepared in the same manner as described for Elastomer 1 except 100 parts by weight of Prepolymer 2 is reacted with the an isocyanate reactive composition that comprises Polyol C (73.88 parts by weight), Polyol D (11.63 pbw) and Polyol E (7.2 pbw). This represents an isocyanate reactive composition wherein the three principle components are present in a mole ratio which corresponds to 30:20:55.

The elastomer is observed to have the following physical properties:

| Hardness | (ASTM D 2240) | 72-73 Shore A |
|---|---|---|
| Rebound | (ASTM D 2632) | 74 percent |
| Clarity Index | | 100 |

Comparative Elastomer A

Elastomer A is prepared in the same manner as described for Elastomer 1 except 100 parts by weight of Prepolymer 1 is reacted with the an isocyanate reactive composition that comprises Polyol A (87.04 parts by weight) and Polyol E (9.09 pbw). Polyol D is absent from the isocyanate-reactive composition. This represents an isocyanate reactive composition wherein the three principle components are present in a mole ratio which corresponds to 30:0:70.

The elastomer is observed to have the following physical properties:

| Hardness | (ASTM D 2240) | 77 Shore A |
|---|---|---|
| Rebound | (ASTM D 2632) | 60 percent |
| Clarity Index | | 0 |

Comparative Elastomer B

Elastomer B is prepared in the same manner as described for Elastomer 1 except 100 parts by weight of Prepolymer 2 is reacted with the an isocyanate reactive composition that comprises Polyol B (89.22 parts by weight) and Polyol E (9.16 pbw). Polyol D is absent from the isocyanate-reactive composition. This represents an isocyanate reactive composition wherein the three principle components are present in a mole ratio which corresponds to 30:0:70.

The elastomer is observed to have the following physical properties:

| Hardness | (ASTM D 2240) | 76 Shore A |
|---|---|---|
| Rebound | (ASTM D 2632) | 72 percent |
| Clarity Index | | 0 |

Comparative Elastomer C

Elastomer C is prepared in the same manner as described for Elastomer 1 except 100 parts by weight of Prepolymer 2 is reacted with the an isocyanate reactive composition that comprises Polyol C (88.65 parts by weight) and Polyol E (9.16 pbw). Polyol D is absent from the isocyanate-reactive composition. This represents an isocyanate reactive composition wherein the three principle components are present in a mole ratio which corresponds to 30:0:70.

The elastomer is observed to have the following physical properties:

| Hardness | (ASTM D 2240) | 76 Shore A |
|---|---|---|
| Rebound | (ASTM D 2632) | 72 percent |
| Clarity Index | | 0 |

Comparative Elastomer D

Elastomer D is prepared in the same manner as described for Elastomer 1 except 100 parts by weight of Prepolymer 4 (not obtained from a polycaprolactone polyol) is reacted with the an isocyanate reactive composition that comprises Polyol C (87.21 parts by weight) and Polyol F (14.62 pbw). Polyol D is absent from the isocyanate-reactive composition. This represents an isocyanate reactive composition wherein the three principle components are present in a mole ratio which corresponds to 30:0:70.

The elastomer is observed to have the following physical properties:

| Hardness | (ASTM D 2240) | 76 Shore A |
|---|---|---|
| Rebound | (ASTM D 2632) | 72 percent |
| Abrasion Resistance | (ASTM D 3389) | 20 mg/1000 cycles |
| Clarity Index | | 100 |

While good resilience and clarity is exhibited by the elastomer obtained from a urethane-modified isocyanate based on a polyether polyol, in contrast to polycaprolactone polyol, it displays poor abrasion resistance.

Comparative Elastomer E

Elastomer E is prepared as described in G.B. Patent 1,256,900; wherein an isocyanate reactive composition containing Polyol A (100 parts), Polyol G (13.1 parts) and Polyol E (7 parts) is first prepared and brought to 30° C. and then intimately mixed with Isocyanate A at 50° C. After mixing for 40 seconds (2500 rpm, Flactek Speed Mixer), the resulting mass is poured into a compression button mold preheated to 125° C. After about 13 minutes, the elastomer is demoulded and subsequently conditioned at room temperature for 7 days prior to measurement of physical properties as reported below.

| Hardness | (ASTM D 2240) | 75 Shore A |
|---|---|---|
| Rebound | (ASTM D 2632) | 50 percent |
| Clarity Index | | 0 |

The resulting elastomer, obtained by a non-prepolymer procedure failed to exhibit the desired degree of optical clarity. The alleged transparency as reported in G.B. Patent 1,256,900 may have been as consequence of the subsequent extrusion of this thermoplastic elastomer.

While the invention has been described in detail and with reference to specific examples thereof, it will be apparent to one skilled in the art that various changes and modifications can be made therein without departing from the spirit and scope thereof.

That which is claimed:

1. A roller skate or roller blade wheel molded or shaped from a thermoset polyurethane elastomer comprising the reaction product of:
   (a) a urethane-modified isocyanate, wherein said urethane-modified isocyanate comprises the reaction product of an aromatic polyisocyanate comprising methylene diphenylisocyanate with a polycaprolactone polyol and/or a caprolactone ether copolymer polyol, wherein said polycaprolactone polyol or said caprolactone ether copolymer polyol each has a molecular weight in the range of from 1,000 to 10,000 Dalton, wherein the methylene diphenylisocyanate comprises at least 80 percent by weight of the 4,4'-methylene diphenylisocyanate isomer;
   (b) isocyanate reactive components comprising:
      a polycaprolactone polyol and/or a caprolactone ether copolymer polyol, wherein said polycaprolactone polyol or said caprolactone ether copolymer polyol each have an average molecular weight of greater than 1000 Dalton; in the presence of a polycaprolactone polyol and/or a polyether polyol, wherein said polycaprolactone polyol or said polyether polyol each have an average molecular weight of 300 to 900 Dalton; and in the presence of an aliphatic chain extending agent which is a diol having from 2 to 16 carbon atoms;
      wherein thermoset polyurethane elastomer has a rebound-resilience of at least 50 percent, according to test procedure ASTM-D-2632, a clarity index of at least 80 percent, and an abrasion resistance (loss) of less than 15 mg/1000 cycles, according to test procedure ASTM D-3389.

2. The roller skate or roller blade wheel according to claim 1 wherein the methylene diphenylisocyanate comprises at least 85 percent by weight of the 4,4'-methylene diphenylisocyanate isomer.

3. The roller skate or roller blade wheel according to claim 1 wherein the urethane-modified isocyanate has an isocyanate content of from 5 to 15 weight percent.

4. The roller skate or roller blade wheel according to claim 1.

* * * * *